United States Patent [19]

Tezuka et al.

[11] 4,224,345
[45] Sep. 23, 1980

[54] CHEWING GUM BASE AND A COMBINATION OF A CHEWING GUM WITH FATTY MATTER

[75] Inventors: Shichigoro Tezuka, Kawasaki; Masaki Shibata, Musashino, both of Japan

[73] Assignee: Lotte Co., Ltd, Tokyo, Japan

[21] Appl. No.: 951,719

[22] Filed: Oct. 16, 1978

[51] Int. Cl.² ............................................. A23G 3/30
[52] U.S. Cl. ............................................. 426/3; 426/6
[58] Field of Search ........................ 426/3, 5, 6, 4, 103

[56] References Cited

U.S. PATENT DOCUMENTS

| | | | |
|---|---|---|---|
| 1,786,831 | 12/1930 | Dellenbarger | 426/3 |
| 2,286,712 | 6/1942 | Borglin | 426/6 |
| 2,353,927 | 7/1944 | Pickett | 426/3 |
| 2,413,239 | 12/1946 | Manson | 426/6 |
| 3,262,784 | 7/1966 | Bucher | 426/5 |
| 3,995,064 | 11/1976 | Ehrgott | 426/3 |

*Primary Examiner*—Jeanette M. Hunter

[57] ABSTRACT

A chewing gum base consisting of about 18 to 40% by weight of rubber and about 82 to 60% by weight of basic materials of a chewing gum and a combination of this chewing gum base with ordinary chewing gum additives and fatty matter.

5 Claims, No Drawings

CHEWING GUM BASE AND A COMBINATION OF A CHEWING GUM WITH FATTY MATTER

BACKGROUND OF THE INVENTION

This invention relates to a chewing gum base and particularly to a chewing gum base suitable to mixing and joining with a fatty matter such as a chocolate and the like and to a combination of the chewing gum with a fatty matter.

As a chewing gum in combination with chocolate, there have been proposed various types such as a plate or spherical type of chewing gum coated with chocolate, a chocolate coated with a chewing gum, a chocolate containing sugar-coated chewing gums dispersed therein and the like.

The chewing gum with chocolate prepared from the conventional chewing gum base, however, has such the disadvantages that the chewing gum becomes very soft to melt when chewed and tends to be swallowed without leaving any chewing residue.

This softening or melting phenomenon of the gum is caused by such the fatty matter as cacao butter essentially contained in chocolate in an amount of approximately 30 to 35% for which reason the preparation of the chewing gum with chocolate is practically difficult and as a substitute, therefore, has been produced a chewing gum which is flavored with cocoa powder or chocolate flavor free of fatty matter.

In order to overcome the foregoing disadvantages there has been proposed a method of preparing a chewing gum in combination with chocolate in which a content of sugar is restricted to the upper limit of 50% in consideration of the fact that the softening or mixed melting phenomenon of the chewing gum with chocolate is caused not only by action of a plasticizer in the chewing gum but also under the influence of the content of sugar especially more than 50% by weight contained in the chewing gum.

When the sugar content is restricted to less than 50%, however, sweetness and flavoring intensity of the chewing gum become insufficient as compared with the conventional chewing gum with the sugar content of 65 to 80% by weight with such the disadvantages that an amount of the gum base to be used must be increased with much cost and that the softening phenomenon of the gum texture when the chocolate with high content of cacao butter is used may not be avoided even if the melting of the gum could be suppressed.

The inventors have exercised various tests for the chewing gum with a fatty matter which is prepared from various gum base materials and fats on the assumption that the undesired matters might be caused essentially by the plasticizing action (softening action) of the fatty matter in chocolate against the gum base and secondarily by the mixed melting phenomenon of the chewing gum with chocolate containing the plasticizer or sugar and as a result confirmed the fact that a natural resin, a vinyl acetate resin or an ester gum shows a conspicuous plasticizing effect whereas a wax, an emulsifier, a calcium carbonate and a talc have no influence on the softening function on account of fatty matter. Further, it has been confirmed that the natural rubber and the synthetic rubber such as isoprene-isobutylene rubber (IIR), styrene-butadiene rubber (SBR), high molecular polyisobutylene, low molecular polyisobutylene or the like shows a high resistance to the softening function on account of the fatty matter as compared with the natural resin, the vinyl acetate resin and the ester gum.

On the basis of the facts confirmed, the inventors have earnestly studied to improve the resistance to softening of the chewing gum against the fatty matter and have now found out that the resistance to softening may considerably be enhanced by reducing an amount of natural resin, vinyl acetate resin and ester gum while increasing an amount of natural or synthetic rubber to more than 18%. While it has been known that an addition of the rubber gives an appropriate elasticity to the conventional chewing gum, an addition of more than 15% of the rubber makes the product very elastic to cause a hardening phenomenon during the late chewing period. Thus a minimum amount of the rubber has been used in the conventional chewing gum.

Further, it has been found that an amount of the rubber to be used in the chewing gum base depends on an optional selection of a type of fatty matter to be used, a ratio of the gum base to the fatty matter, a gum flavor to be used and the like, but use of more than 40% of the rubber makes the product very elastic to lose the good texture of the chewing gum.

SUMMARY OF THE INVENTION

It is, therefore, a general object of the invention to provide a chewing gum base for preparing a chewing gum which has the good texture and does never cause the softening or melting phenomenon when combined with a fatty matter, and thus to provide a combination of the chewing gum with the fatty matter.

A principal object of the invention is to provide a chewing gum base which comprises approximately 18 to 40% by weight of rubber and approximately 82 to 60% by weight of basic materials of a chewing gum containing vinyl acetate resin, ester gum, wax, emulsifier, calcium carbonate, talc and others.

In the chewing gum base according to the invention, the rubber may be selected from one or more of natural rubber, polyisobutylene, isoprene-isobutylene rubber and styrene-butadien rubber and especially a mixture of low molecular polyisobutylene with isoprene-isobutylene rubber is preferred.

Another object of the invention is to provide a combination of a chewing gum base according to the invention with chewing gum additives such as sugar, flavor and others, and a fatty matter.

The fatty matter may be selected from chocolate, nougat, soft caramel or the like in which the chocolate is most preferred.

When the chocolate is used as a fatty matter, it is preferred that the chewing gum additives containing sugar and flavor are added to the chewing gum base of the invention and kneaded to make spherical masses which are then coated with chocolate.

DESCRIPTION OF PREFERRED EXAMPLES OF THE INVENTION

The chewing gum base of the invention will further be illustrated by way of the following examples as enummerated in Table 1.

TABLE 1

|  | Example 1 | Example 2 | Example 3 | Example 4 | Example 5 | Example 6 | Control |
|---|---|---|---|---|---|---|---|
| Natural rubber | 15 | — | — | — | — | — | — |
| IIR | — | 15 | — | — | — | — | — |
| SBR | — | — | — | — | — | 15 | — |
| High molecular PIB | — | — | 3 | 15 | 25 | — | 5 |
| Low molecular PIB | 15 | 15 | 15 | 15 | 15 | 15 | 5 |
| Vinyl acetate resin | 18 | 18 | 28 | 18 | 13 | 18 | 32 |
| Ester gum | 10 | 10 | 10 | 10 | 10 | 10 | 16 |
| Wax | 22 | 22 | 22 | 22 | 22 | 22 | 22 |
| Monoglyceride | 2 | 2 | 2 | 2 | 2 | 2 | 2 |
| Calcium carbonate | 18 | 18 | 18 | 18 | 18 | 18 | 18 |
| Total | 100% | 100% | 100% | 100% | 100% | 100% | 100% |
| Rubber % | 30% | 30% | 18% | 30% | 40% | 30% | 10% |

Preparation of the Chewing Gum Base

According to the recipe shown in the Table 1, the chewing gum base materials were kneaded at 120° C. for 4 hours to prepare the chewing gum base containing 18 to 40% by weight of the rubber of examples 1 to 6.

With the same method was prepared a control containing 10% by weight of the rubber.

Preparation of the Chewing Gum

To each 200 parts of the chewing gum bases of Examples 1 to 6 were added 570 parts of powder sugar prepared by grinding granulated sugar, 100 parts of glucose, 120 parts of starch syrup and 10 parts of vanilla flavor. The mixture was kneaded for about 20 minutes and then formed into spherical chewing gums weighing approximately 3 g per piece.

A spherical chewing gum was prepared with use of the control gum base obtained in accordance with the same recipe and procedure.

Coating with Chocolate 300 g of the spherical chewing gums prepared from the chewing gum base of Example 1 were thrown into a coating vessel for coating with 30 g of the pre-tempered chocolate by rotating the coating vessel. Then, 120 g of flaky chocolates were added portionwise to the vessel for melting stepwise by introducing a hot air to laminate the chocolate layers on the chewing gum. Subsequently, the chewing gums coated with chocolate were cooled and dried by cold air and then coated with syrup and a solution of shellac for glazing. Thus, the chewing gums coated with chocolate so-called as marble gums and weighing about 4.5 g per piece were obtained.

The chocolate coated marble gums were prepared with use of the gum bases of Examples 2 to 6 and the control respectively.

Organoleptic Test

The marble gums thus prepared were evaluated by a panel consisting of ten persons to give the results as shown in the following Table 2.

TABLE 2

| Organoleptic evaluation | Chewing gum of Example 1 | Chewing gum of Example 2 | Chewing gum of Example 3 | Chewing gum of Example 4 | Chewing gum of Example 5 | Chewing gum of Example 6 | Control chewing gum |
|---|---|---|---|---|---|---|---|
| Melting | 0 | 0 | 2 | 0 | 0 | 0 | 10 |
| Softening in the middle chewing period | 1 | 0 | 3 | 0 | 0 | 0 | 0 |
| Good feeling | 9 | 8 | 5 | 9 | 4 | 8 | 0 |
| Elasticity | 0 | 2 | 0 | 1 | 2 | 1 | 0 |
| Hardening in the late chewing period | 0 | 0 | 0 | 0 | 4 | 1 | 0 |

In the above table 1 the numerals represent the number of persons who perceive the feelings listed in the left column.

As obvious from the Table 2, the chewing gums with chocolate prepared from the chewing gum bases according to the invention are extremely improved in the melting phenomenon. Moreover, the examples show that less than 18% of the rubber content gives the high melting phenomenon to the chewing gum combined with chocolate while more than 40% of the rubber content gives the hardening effect.

While the chewing gum base and the combination of the chewing gum with the fatty matter of the invention has been illustrated by way of the preferred embodiments, it should be understood that the rubber used in the chewing gum base may be selected from one or more of any rubbers and may be combined with other rubber(s) at any selected ratio. Further, it should be understood that the chewing gum may be combined with the fatty matter not only by the coating technique but also by the stacking process or by an inclusion of the fatty matter as a center filling or a mix in the chewing gum. Moreover, the ratio of the chewing gum to the fatty matter may be varied in the range of 1:0.2 to 1:2.5.

In accordance with the invention, the confection of the chewing gum with the fatty matter of rich flavor and good texture may be conveniently produced.

What is claimed is:

1. A base composition for chewing gum comprising vinyl acetate resin, ester gum, wax, emulsifier, calcium carbonate, talc and a fatty matter, and about 30 to 40% by weight of rubber.

2. A chewing gum product comprising in combination the base composition of claim 1, flavor and sugar.

3. Composition according to claim 1, wherein said rubber is selected from the group consisting of natural rubber, polyisobutylene, isoprene-isobutylene rubber, styrene-butadiene rubber and mixtures thereof.

4. Composition according to claim 3, wherein said rubber consists of a mixture of low molecular polyiosbutylene and isoprene-isobutylene rubber.

5. Product according to claim 2, wherein the fatty matter is chocolate.

* * * * *